United States Patent
Yopp et al.

(10) Patent No.: US 9,996,874 B2
(45) Date of Patent: Jun. 12, 2018

(54) CHARACTER PERSONAL SHOPPER SYSTEM

(71) Applicant: Oracle International Corporation, Redwood Shores, CA (US)

(72) Inventors: John Yopp, Minneapolis, MN (US); Charles Pilon, Saint Paul, MN (US)

(73) Assignee: Oracle International Corporation, Redwood Shores, CA (US)

( * ) Notice: Subject to any disclaimer, the term of this patent is extended or adjusted under 35 U.S.C. 154(b) by 631 days.

(21) Appl. No.: 14/483,629

(22) Filed: Sep. 11, 2014

(65) Prior Publication Data
US 2016/0078512 A1 Mar. 17, 2016

(51) Int. Cl.
| | |
|---|---|
| G06Q 30/00 | (2012.01) |
| G06Q 30/06 | (2012.01) |
| G06T 13/20 | (2011.01) |
| G06T 13/40 | (2011.01) |
| G06F 3/048 | (2013.01) |

(52) U.S. Cl.
CPC ......... *G06Q 30/0643* (2013.01); *G06F 3/048* (2013.01); *G06Q 30/0613* (2013.01); *G06Q 30/0617* (2013.01); *G06Q 30/0639* (2013.01); *G06T 13/20* (2013.01); *G06T 13/40* (2013.01)

(58) Field of Classification Search
CPC ............... G06Q 30/0281; G06Q 30/06; G06Q 30/0601–30/0643; G06Q 30/08; G06Q 90/20; G06F 3/048; G06F 3/011; G06F 3/014; G06T 13/00–13/80
See application file for complete search history.

(56) References Cited

U.S. PATENT DOCUMENTS

| | | | |
|---|---|---|---|
| 8,103,247 B2 * | 1/2012 | Ananthanarayanan | H04W 12/06 455/410 |
| 8,482,859 B2 | 7/2013 | Border et al. | |
| 8,542,906 B1 * | 9/2013 | Persson | G06K 9/00671 382/103 |
| 8,606,645 B1 | 12/2013 | Applefeld | |
| 8,639,440 B2 | 1/2014 | Nicholson | |
| 2003/0028498 A1 * | 2/2003 | Hayes-Roth | G06N 99/005 706/17 |
| 2008/0183678 A1 * | 7/2008 | Weston | G06F 17/30867 |
| 2009/0182499 A1 | 7/2009 | Bravo | |
| 2009/0322671 A1 | 12/2009 | Scott et al. | |
| 2010/0278345 A1 * | 11/2010 | Alsina | H04L 63/0492 380/283 |

(Continued)

OTHER PUBLICATIONS

Employing personality-rich virtual persons. Ido Iurgel. Aderito Marcos. Computers & Graphics vol. 31, Issue 6, Dec. 2007, pp. 827-836. (Year: 2007).*

(Continued)

*Primary Examiner* — William J Allen
(74) *Attorney, Agent, or Firm* — Potomac Law Group, PLLC

(57) ABSTRACT

Shopping assistance using an interactive character is provided on a shopping device in a retail store. Input requesting assistance from a character displayed on the shopping device is received on the shopping device. The input is processed. A response is determined based on the input and a character personality profile for the character displayed. The response is generated through the character on the shopping device, providing shopping assistance.

17 Claims, 5 Drawing Sheets

(56) References Cited

U.S. PATENT DOCUMENTS

| | | | |
|---|---|---|---|
| 2010/0324941 A1* | 12/2010 | Stevenson | G06N 3/006 705/4 |
| 2012/0330791 A1* | 12/2012 | Stevenson | G06N 3/006 705/26.61 |
| 2013/0231990 A1 | 9/2013 | Munjal et al. | |
| 2013/0293580 A1* | 11/2013 | Spivack | G06Q 30/0643 345/633 |
| 2013/0346168 A1 | 12/2013 | Zhou et al. | |
| 2014/0108178 A1* | 4/2014 | Cao | G06Q 30/0641 705/26.2 |
| 2015/0046168 A1* | 2/2015 | Gandrabur | G10L 15/1822 704/275 |
| 2015/0095150 A1* | 4/2015 | Globe | G06Q 40/06 705/14.53 |

OTHER PUBLICATIONS

Nearbuy Systems + RetailNext, Inc.; "Nearbuy Micro-Location"; http://www.nearbuysystems.com/products/micro-location.html; last downloaded on Mar. 24, 2014.

RetailNext, Inc.; "Improve Store Execution"; http://www.nearbuysystems.com/solutions/in-store-analytics.html; last downloaded on Mar. 24, 2014.

J. Choi et al.; "Intelligent Wearable Assistance System for Communicating with Interactive Electronic Media"; ICAT Dec. 3-5, 2003, Tokyo, Japan.

D. Wagner et al.; "Towards Massively Multi-User Augmented Reality on Handheld Devices"; Proceedings of the 3rd International Conference on Pervasive Computing (Pervasive 2005); 2005; pp. 208-219.

S. Mann; "Telepointer: Hands-free completely self contained wearable visual augmented reality without headwear and without any infrastructural reliance"; Institute of Electrical and Electronics Engineers; pp. 177-178; Meeting Date: Oct. 16-17, 2000.

"Google Glass prescription frames, shades are coming"; http://www.cbc.ca/news/technology/google-glass-prescription-frames-shades-are-coming-1.2513762; last downloaded on Mar. 24, 2014.

T. Starner et al.; "Augmented Reality Through Wearable Computing"; M.I.T. Media Laboratory Perceptual Computing Section Technical Report No. 397; to appear: presence, special issue on augmented reality; 1997.

* cited by examiner

CHARACTER PERSONAL SHOPPER SYSTEM

FIELD

One embodiment is directed generally to a computer system, and in particular to a computer system that facilitates shopping.

BACKGROUND INFORMATION

With the increasing popularity of online shopping, brick and mortar stores continuously look for ways to keep consumers coming into stores and, more importantly, to make their purchases in stores. Brick and mortar stores do not desire to be a "showroom" for an online store.

However, shopping in large or complex stores can become a disconnecting experience where the consumer focuses on finding a particular item as quickly as possible and then leaving. Consumers who are disconnected from the in-store experience are more likely to research prices online and order the item from an online competitor. With the advent of smartphone technology, consumers can research prices and purchase from an online competitor while standing in front of the physical product.

Engaging consumers can lead to an in-store experience differentiation that can overcome the "showroom" effect and lead to higher conversion rates and larger market baskets. For example, some stores have tried using greeters to direct consumers to the products of interest or trained staff who roam department aisles to give advice.

SUMMARY

In one embodiment, shopping assistance using an interactive character is provided on a shopping device in a retail store. Input requesting assistance from a character displayed on the shopping device is received on the shopping device. The input is processed. A response is determined based on the input and a character personality profile for the character displayed. The response is generated through the character on the shopping device, providing shopping assistance.

DETAILED DESCRIPTION

One embodiment provides a personalized, immersive, and interactive shopping experience that connects the shopper to the store. An expert shopping assistant can be accessed using the consumer's smartphone or tablet, augmented reality device, or store provided device. The assistant can be an artificial intelligence based personal shopper to help the consumer through the store, find items, and present customized deals. The assistant can be presented in the personality of a particular character or character-type based on the store or the shopper. The personalized shopping assistant or "personal shopper" can be tailored to the needs of the shopper. For example, a store carrying children's goods can present a personal shopper princess character for use by a young girl that is interested in princess related items. Girls interested in planes or trucks could likewise have a personalized character aligned to those interests, such as a personified cartoon truck, plane, or car character. Sensors, cameras, microphones, Bluetooth beacons, or other input devices can be used to determine the user's location, path, and movement through the store, to receive input requests from the user requesting shopping assistance, and to analyze the user by determining things like size and previous purchases by the user or other users similarly situated in the user's market segment demographic or location for the purpose of recommending clothing or other items. The knowledge gained by the system for a particular store can be shared by other stores, thereby increasing the knowledge of the entire system.

Figure 1:
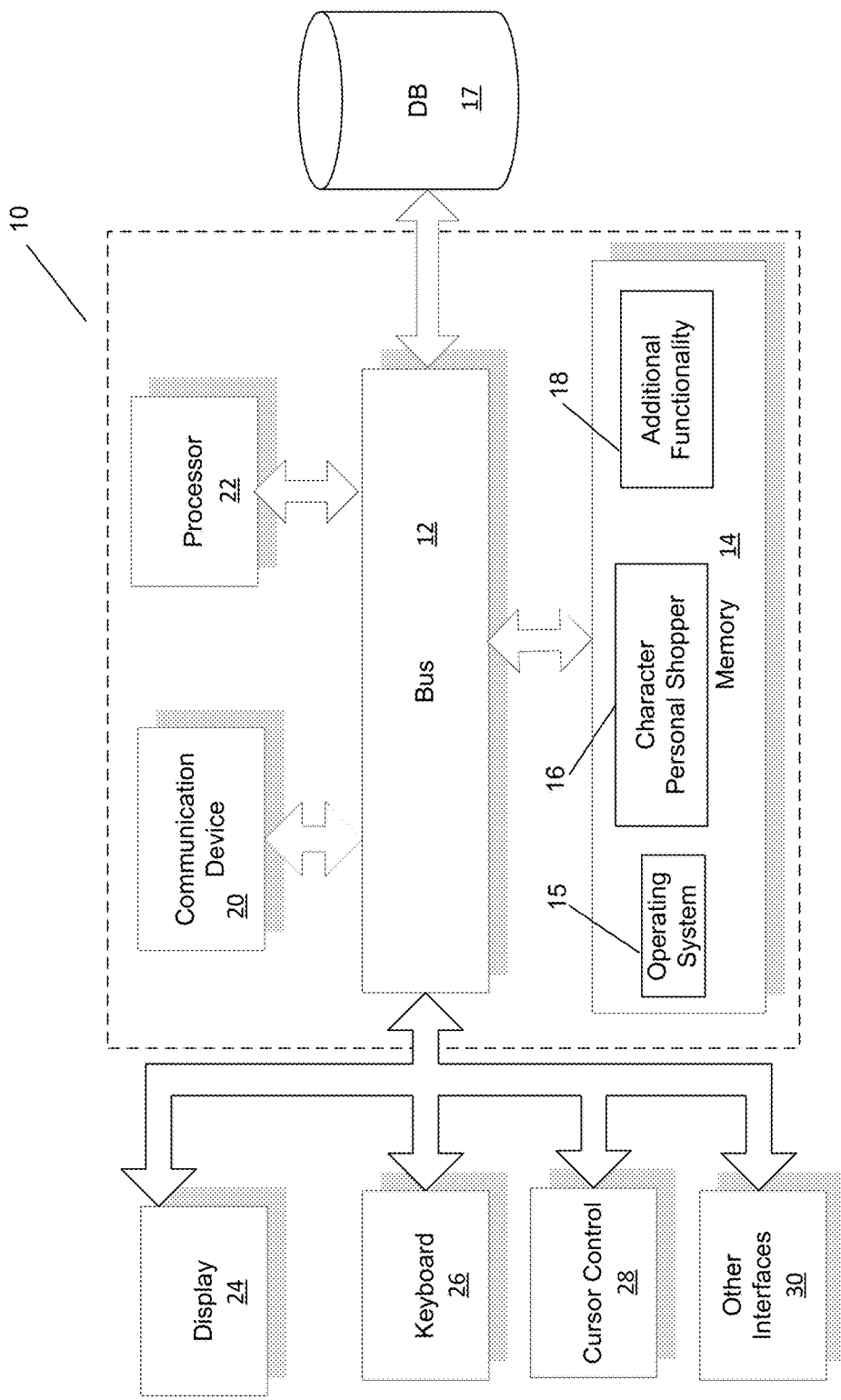
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card or Bluetooth adapter, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), an augmented display, or smart glasses, such as limited field of view "Google Glass" by Google Inc. or full field of view "Moverio" glasses by Epson Corp. A keyboard 26 and a cursor control device 28, such as a computer mouse or touchscreen, can be further coupled to bus 12 to enable a user to interface with system 10. Other interface devices 30 are coupled to processor 22, and are particular to character personal shopper systems in accordance with embodiments of the invention. Described in greater detail below, these devices can include cameras, depth perceiving cameras, microphones, speakers, Bluetooth beacons, and the like.

In one embodiment, memory 14 stores software modules that provide functionality when executed by processor 22. The modules include an operating system 15 that provides operating system functionality for system 10. The modules further include a character personal shopper module 16 that provides and processes personal shopping assistant data, as disclosed in more detail below. System 10 can be part of a larger system, such as a retail merchandising system. Therefore, system 10 will typically include one or more additional functional modules 18 to include the additional functionality. In one embodiment, additional functionality 18 can be provided by an iteration of "Oracle Retail Merchandising System" by Oracle Corp. In some embodiments, additional functionality 18 can include a merchandising system that includes merchandising information about products in the knowledge base of the character personal shopper. A database 17 is coupled to bus 12 to provide centralized storage for modules 16 and 18 and store one or more data sets to support contextual data processing, etc. Some embodiments may not include all of the elements in FIG. 1.

A personal shopping assistant in one embodiment can be used to provide a consumer with an immersive shopping experience. Brick and mortar retailers have the higher overhead cost of providing a retail space that online retailers do not have. One goal is for shoppers to convert their interest into purchases in the retail location rather than use the retail location as a "showroom" for an internet retailer. By providing an immersive shopping experience, embodiments can enable shoppers to be invested enough to purchase the product at the moment even if the price is slightly higher than an online offering.

Embodiments provide a character-based personal shopping assistant. For retailers with a strong set of character personalities, such as Disney, DreamWorks, or Pixar, the character personal shopping assistant can be selected from a set of available characters and be presented in the voice and personality of the character selected. Other retailers may also be able to have themed character personal shoppers. For example, a hardware store such as Lowes or Home Depot may have a handyman/handywoman character wearing a hardhat and safety vest. Still other retailers can have other generalized character personal shopping assistants. For example, a set of characters can be made available for selection by a child, such as a princess, pirate, astronaut, ball player, athlete, tomboy, etc. Still other retailers can use the licensed characters of others. For example, a retailer could license the use of an interactive Lego "minifigure" character, personally built by the shopper. Characters can be made available in multiple skin tones and facial features.

The character-based personal shopping assistant in accordance with some embodiments is powered by an artificial intelligence engine that leverages neural networks to "learn" associations based on user behavior. In some embodiments, however, the actual assistance can be provided by trained representatives operating the character shopping assistant remotely. This arrangement may be helpful for character personal shopper systems that are just getting started. Further, traditional approaches of trained neural networks can be used, for example using the community-based "Neuroph" framework. Initially, neural networks can be trained from an initial rollout leveraging live character personal shoppers. Support personnel can control the character personal shopping assistants and identify patterns of reactions through a scripted interaction. Machine learning algorithms can adapt those patterns to allow the program to create an appropriate response to a user. For example, "Mahout" by Apache could be used as a machine learning algorithm platform.

Game applications can be offered on a mobile or smart glasses device to allow a user to play an interactive game with the character. Games can include any type of gameplay, but could be product or brand focused to offer additional avenues of advertising related to specific products.

Retailers implementing the character personal shopping system can compete with an online shopping experience by making the visit to the brick and mortar store more compelling while remaining just as informative with supplemental item information offered in the device interface. Lessons learned by the AI engine for one store can be applied to all stores.

Embodiments consistent with the present invention allow a user to use a character based shopping assistant in an interactive way, for example, by asking it natural questions and receiving personalized responses.

Figure 2:
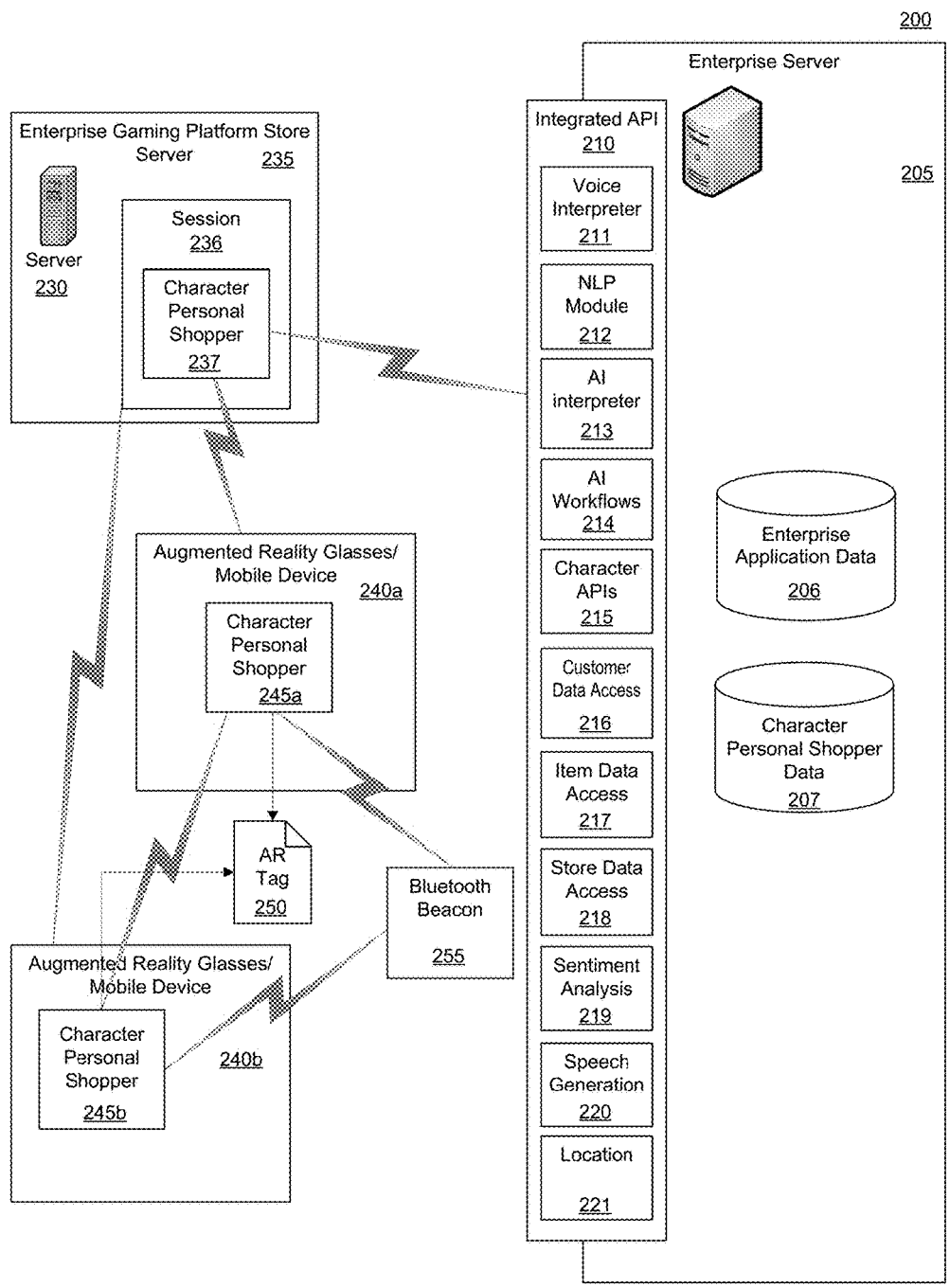
FIG. 2 is a block diagram of a character personal shopper system in accordance with some embodiments.

FIG. 2 is a block diagram of a character personal shopper system 200 in accordance with some embodiments. An enterprise server 205 stores enterprise application data 206 and character personal shopping data 207. Enterprise application data 206 stores information for enterprise applications tied to the character personal shopper system. Character personal shopping data 207 stores information related to the characters as artificial intelligence information gathered about shoppers. Server 205 also contains an integrated application programming interface ("API") 210 with API modules for interfacing with other components of character personal shopping system 200. API module voice interpreter 211 receives voice information and files captured by a microphone and converts the information into text. Voice interpreter 211 can be implemented by an off the shelf product such as speech recognition software provided by Nuance for interpreting speech including speech with accents. API module natural language processing ("NLP") module 212 analyzes converted text to interpret language syntax and sentence structure, deconstructing the consumer's speech to identify intent. NLP module 212 can utilize standard natural language processing libraries, such as those available from the Stanford Natural Language Processing Group.

API module artificial intelligence ("AI") interpreter 213 receives processed input and aligns language to AI statements. API module AI workflows 214 provides the AI engine to process AI statements and develop a response. AI workflows 214 can use data from AI interpreter 213 as well as product data, store data, and customer data. API module customer data access 215 provides an access point to access and manage customer personal data. API module item data access 216 provides an access point to access and manage item data. API module store data access 217 provides an access point to access and manage store data, such as store layout and design, available products and their details and location, and the placement of input cameras and sensors for the character personal shopper system.

API module sentiment analysis 219 identifies the positive or negative mood of a consumer, allowing pattern matching software to use the perceived context to generate an emotionally appropriate response. Sentiment analysis 219 can be implemented with Stanford natural language processing using Matlab. Sentiment analysis 219 can also include voice pattern recognition that indicates mood. API module speech generation 220 generates speech according to a determined response. Speech generation 220 can include inflection based on the output of sentiment analysis 219. API module location 221 can determine the location of the shopper using various inputs available. For example, location 221 can use inputs from cameras, locator beacons, and microphones to determine where a shopper is. Other API modules not pictured include a three-dimensional ("3D") camera module for determining a shopper's size for predicting and suggesting clothes that the shopper may be interested in. 3D cameras can include devices such as the "Structure Sensor"

by Occipital, which can help import 3D item and person information. Another API module not pictured is a gaze analysis module for interpreting what the customer is looking at and for how long. Such data can be used for future analysis as well as a context for image recognition framework on what exactly in the viewing area the consumer is paying attention to. Gaze analysis can be implemented by "The Eye Tribe Tracker" software by Eye Tribe ApS or another suitable application. Another API module not pictured is a socialization module for linking multiple shoppers and character personal shopping assistants together. Using the socialization module, not only can shoppers interact, but the AI characters can also interact.

A server 230 can execute an enterprise gaming platform store server 235 for interacting with server 205 and providing character personal shopping assistants using API 210. Session 236 can execute a character personal shopper application 237 that interacts with server 205 and individual devices 240a/b. Device 240a, for example includes a character personal shopper application 245a. Device 240a can be augmented reality ("AR") glasses, another AR device, a mobile device such as a tablet or smartphone, or a store-provided device with a display and such as discussed above with respect to FIG. 1. Device 240b includes a character personal shopper application 245b. Devices 240a/b can interact with AR tags, such as AR tag 250, located throughout the store. When a camera on device 240a or b sees AR tag 250, it can be replaced on display 24 with AR data, such as interactive data associated with a product, service, or feature for the AR tag. For example, an AR tag next to a product can be dynamically replaced on display 24 with a video that highlights features of the product, or can trigger a listing on display 24 of detailed product specification information with up to date pricing and availability information, related products, and a prompt to purchase the product, or can offer to play an interactive game with the user. Bluetooth beacon 255 can provide device to device connectivity by extending Bluetooth range across a local Bluetooth network, such as a wireless Bluetooth network arranged in a mesh or cell configuration. Bluetooth beacon 255 can also help determine location of the device in the store by tracking signal strength to the device relative to other Bluetooth beacons. In other embodiments, connectivity can be provided by another type of wireless network, such as a wireless local area network ("WLAN") operating under a standard such as Institute of Electrical and Electronics Engineers ("IEEE") standard 802.11n and the like.

Figure 3:
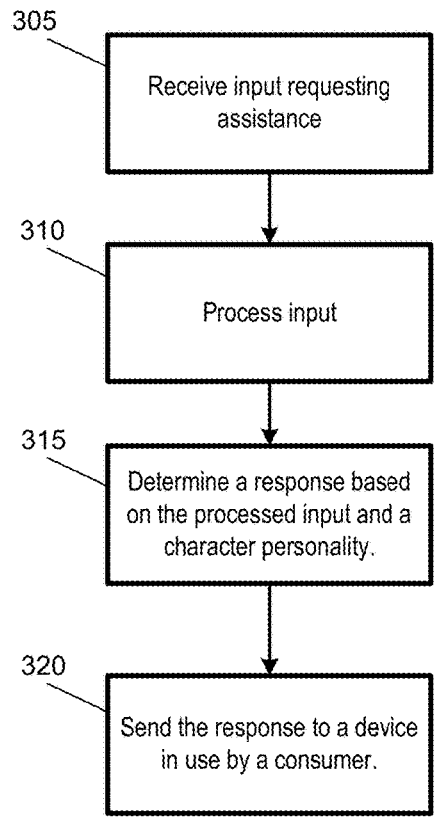
FIG. 3 is a flow diagram illustrating a character personal shopper system in accordance with some embodiments.

FIG. 3 is a flow diagram illustrating a character personal shopper system in accordance with some embodiments. In one embodiment, the functionality of the flow diagram of FIG. 3 (and of FIGS. 4-6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In some embodiments the flow of FIG. 3 can be executed by a shopper in a retail store using AR hardware, such as a smartphone, AR glasses, and the like. The shopper can execute a program on the hardware to request shopping assistance in the retail store. The program can generate a character-based personal shopping assistant. The character-based personal shopping assistant can be a graphic image of a character generated on the device. In some embodiments the character image can be animated when the character speaks so that the character's mouth appears to move approximately according to the words being "spoken." The shopper can interact with the character in the store to request assistance from the character.

At 305, input requesting assistance is received. Input can include any type of communicative action, including voice commands, mouse or touch input, or gestures. For example, a shopper or user may request assistance to find a certain type of product. At 310, the input is processed. For voice input, voice interpreter module 211 can convert the voice command to text, apply NLP module 212 and sentiment analysis 219. AI interpreter 213 can be used to map the request into an AI workflow 214. AI workflow 214 can use item data access 217 and store data access 218 to find relative products to the input. AI workflow 214 can use customer data access 216 to access available customer data that may indicate which brands or options that the user may likely be interested in.

At 315, a response is determined based on the input and a character personality. The response can be based primarily on the factors considered in flow element 310, but formatted in a way that is consistent with the character's personality. At 320, the response is sent to a device in use by the consumer or shopper. The response can be speech generated or sent to the display as text. If speech generated, an animated image representation of the character personal shopper, e.g., a princess, frog, handyman, etc., can be controlled to correspond to the speech. In other words, the character's animated mouth can move to approximately correspond to the speech generated. The generated speech can be in the character's voice.

Figure 4:
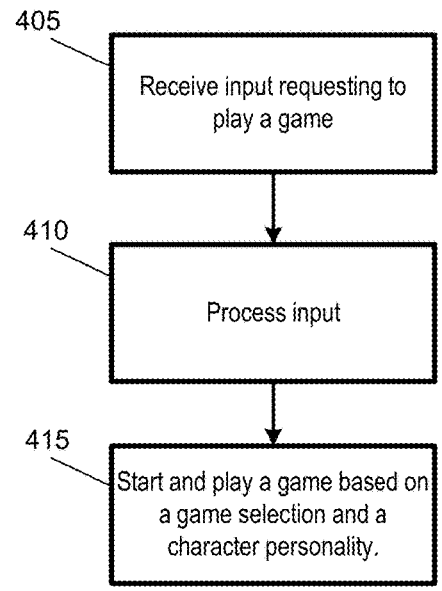
FIG. 4 is a flow diagram illustrating a character personal shopper system in accordance with some embodiments.

FIG. 4 is a flow diagram illustrating a character personal shopper system in accordance with some embodiments. In some embodiments the flow of FIG. 4 can be executed by a shopper in a retail store using AR hardware, such as a smartphone, AR glasses, and the like. The shopper can execute a program on the hardware to request to play a game in the retail store. The program can generate a character-based personal shopping assistant to assist in game play. The character-based personal shopping assistant can be a graphic image of a character generated on the device. The shopper can interact with the character in the store to play a game on the device.

At 405, input requesting to play a game is received. Input can include any type of communicative action, including voice commands, mouse or touch input, or gestures. For example, a shopper or user may request to play a game with the character or request to play a game where the character is not directly involved in the gameplay. At 410, the input is processed in a way similar to that described above with respect to flow element 310. AI workflow 214 can provide game variations based on customer data access 216 to access available customer data that may indicate which brands or types of products the user may likely be interested in.

At 415, a game is started and played based on a game selection and the character personality. Game options can be provided to the user and the user can select which game they want to play. The game can be executed. In some games, the user can interact with the character. For example, a game where the character asks the user questions and the user provides answers can be played directly with the character. In other games, the shopping device can execute a game with graphics and interfaces designed for the game. For example, a game where the user plays mini-golf can provide graphics and interactions suitable for that type of game play. In either case, the character can provide comments based on the user's game choice and progress throughout the game.

The interactions with the character can be generated in such a way as to preserve the character's personality traits.

Game play can help make the shopping trip an event rather than a chore. A game can engage the customer in a way that is enjoyable and memorable, thus increasing the loyalty of the customer and the likelihood that the customer will purchase items. Game play can also encourage group activities, such as in birthday party groups, a family, or among children. Physical play in the store and group social interaction is something that a physical store can offer that an online competitor may not be able to achieve.

In some embodiments, the shopper can be located in the store by cameras or location beacons connected to system 10 and the response in 315 can include direction information based on the relative location of the user at the time the response is created. In some embodiments, customer data access 216 can include interest information derived from past purchases, routes taken through the store, pauses in the store indicating areas of interest, and gaze analysis. In some embodiments, device 240*a/b* can be, instead of a handheld mobile device, a kiosk type device located throughout the store. In such embodiments, users can login or facial recognition software can be used to provide personal shopping assistance specific to various users. In some embodiments, sentiment analysis can be used to help determine an appropriate response. For example, if sentiment analysis, such as provided by sentiment analysis module 219 determines that the shopper is anxious, the character can use a soothing voice in speech generation and word selection that are intended to calm the shopper.

Some embodiments include a social networking aspect that allows users to interact with each other, such as a Father and Daughter coordinating a shopping trip together in different areas of the store. In addition to the multiple users being connected, each of the character personal shoppers can also connect to each other. Therefore, this allows each character personal shopper to interact with any other connected character or any other connected shopper. For example, as one shopper collects items to purchase from a list, the other shopper's character can coordinate the other shopper's actions to efficiently route the other shopper through the store.

Figure 5:
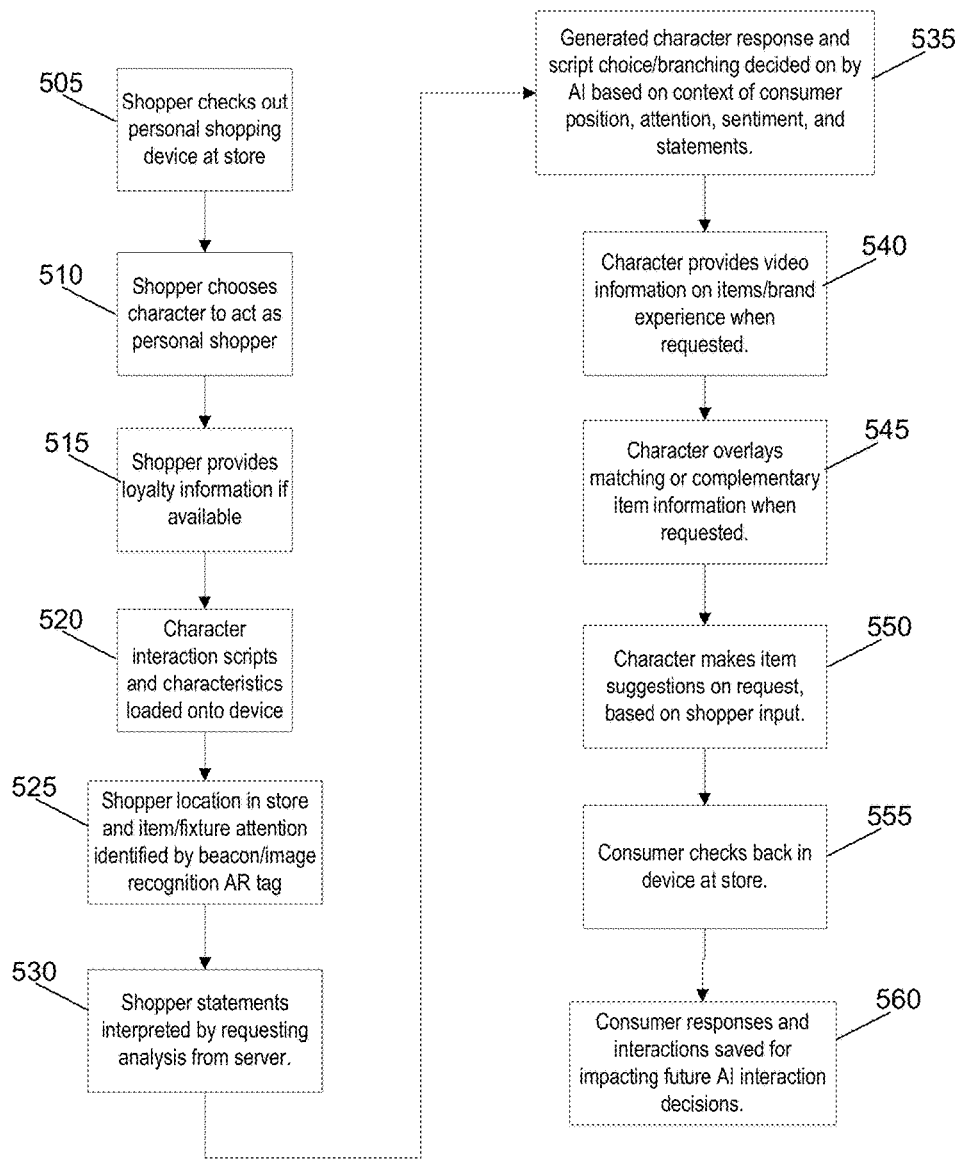
FIG. 5 is a flow diagram illustrating a shopping flow in accordance with some embodiments.

FIG. 5 is a flow diagram illustrating a shopping flow in accordance with some embodiments. At 505, a shopper checks out a personal shopping device at the store. As described above, in some embodiments, the shopper can bring his or her own device and install a character personal shopping app on it. At 510, the shopper chooses a character to act as his or her personal shopper. Available characters can be automatically filtered based on known information about the shopper. For example, if the device or other cameras and sensors or known customer information can determine the approximate age or age range of the shopper as being an adult, the available characters can be filtered out to not include characters intended to be used by children. Likewise, the reverse can be applied—where the user is determined as a child and available characters are those that would more likely be used by a child. Even when the characters are filtered, the user can have the option of displaying all available characters.

At 515, the shopper can provide store loyalty information. This can include entering an identifier like a phone number or scanning a barcode such as on a tag or smartphone display. In some embodiments, facial recognition software can be used to determine the identity of a shopper. Loyalty information can include past purchase information or the results of voluntary surveys taken to build a personalized neural network stem based on individual characteristics of the shopper. At 520, character interaction scripts and characteristics are loaded onto the device. In some embodiments, the device acts as a gateway and most data is generated on a device such as server 230 or enterprise server 205.

At 525, shopper location in the store and item attention is identified by a beacon or image recognition AR tag. The shopper location can constantly or periodically be tracked throughout the store. Also, system 10 can seek to determine what items or fixtures the user focuses on. For example, if the device is an augmented reality display such as wearable smart glasses, an integrated camera can track head movement to determine an approximate field of view. Items within the field of view can be subjected to image recognition provided by image recognition software. As items are recognized, they can provide an indication of the types of items the shopper is interested in.

At 530, shopper statements are captured and passed to server 230 or 205 for processing. As discussed above, statements can be analyzed for their content and sentiment and processed through AI interpreter 213 and AI workflow 214. At 535, a character response can be generated based on AI workflow 214 including script choice and script branching, determined based on the context of consumer position, attention, sentiment, and statements. At 540, the character can provide video information on items or brands experience when requested by the user. At 545, the character can overlay matching or complementary item information when requested. At 550, the character can make item suggestions based on shopper input or shopper profile when requested.

At 555, when the consumer shopper is finished, the shopper can check the device back to the store. At 560, the consumer responses and interactions can be saved for impacting future AI interaction decisions.

Figure 6:
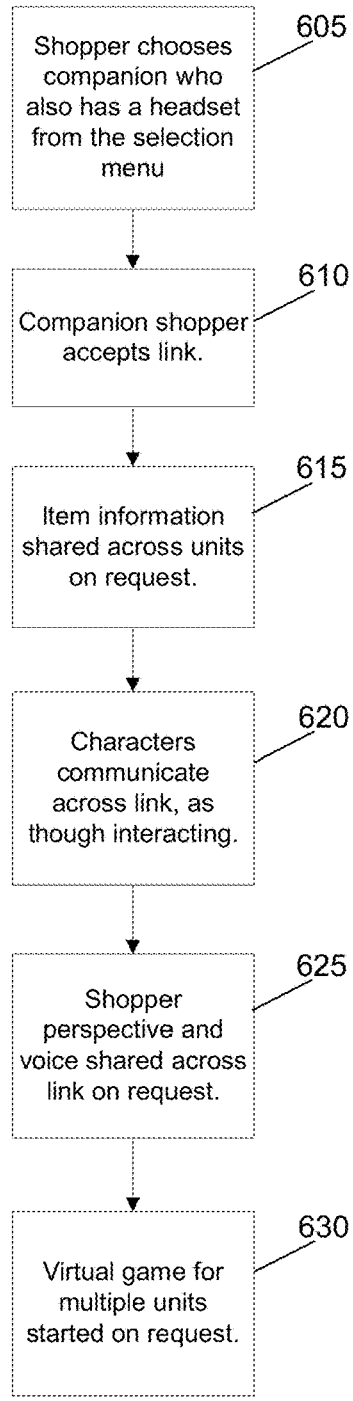
FIG. 6 is a flow diagram illustrating a shopping flow with social networking in accordance with some embodiments.

FIG. 6 is a flow diagram illustrating a shopping flow with social networking in accordance with some embodiments. At 605, a shopper chooses a companion who also has a device or headset from a selection menu. A menu for connecting to other users in the store can be displayed on display 24 of the device used by the shopper for the character personal shopper. The menu can display a list of other devices or users in the store. When the selection of the companion shopper is made, a request can be sent to the companion shopper's device. At 610, the companion shopper can accept the request and link to the initiating shopper. The companion selection can be saved for a future session which can automatically connect two shoppers in a future session.

At 615, item information is shared across units on request. Each linked shopper can share items of interest to other linked shoppers. In some embodiments, shared items can also be posted to a shopper's publicly accessible or limited accessible social networking profile. At 620, characters communicate across linked devices, as though interacting with each other. For example, in one embodiment, a shopper can share an item with another linked shopper and the linked shopper's character personal shopper can comment on the item to the first shopper's linked character personal shopper. At 625, shoppers can share their perspective and voice to other linked shoppers on request. For example, a shopper can post a comment about a shared item to all linked shoppers or particular shoppers. In some embodiments, linked shoppers can share comments by voice, using microphones and speakers provided in their devices. At 630, a game for linked units can be started on request. As described above, games can be provided for users. In linked devices, players can play games together on their linked devices.

As disclosed, embodiments provide a character personal shopper system. Shoppers can use handheld or wearable devices to interact with an AI powered character associated with a store. The AI character can provide product information and details for items of interest. Technology in the store can track the shopper's progress through the store, analyze the path taken and where the shopper lingers to determine items of interest, and perform image and gaze analysis to help determine items of interest. Shoppers can interact with their character personal shopper to get details about certain items, help navigating the store, help with a shopping list, and so forth. Shoppers can play games with the AI character. AR tags can be placed throughout the store and provide specific points of interaction with devices. Shopper's devices can be linked to other shoppers for a community character personal shopper experience.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of providing shopping assistance to a user within a retail store using an interactive character, the method comprising:
   providing by a processor choices of characters to be selected at a shopping device, wherein the choices are based on known information of the user;
   providing at the shopping device the character in response to a selection;
   receiving store loyalty information for the user;
   generating a current location of the shopping device within the store using in store tracking mechanisms;
   receiving input at the shopping device in the retail store, the input requesting shopping assistance from the character, wherein the character is displayed on a display of the shopping device;
   processing the input based on the current location, including items or fixtures in the retail store at the current location;
   determining by the processor a response based on the processed input and a character personality profile corresponding to the character;
   generating the response through the character displayed on the shopping device; and
   executing by the shopping device an augmented reality (AR) application, the AR application:
      identifying, using a camera of the shopping device, one of a plurality of AR tags that are located throughout the retail store, the identified AR tag corresponding to a product and appearing within the display of the shopping device; and
      replacing the AR tag on the display with content related to the corresponding product.

2. The method of claim 1, wherein the input originates from speech and the input processing includes:
   converting the speech to text;
   analyzing the text using natural language processing; and
   analyzing the text for sentiment meaning.

3. The method of claim 1, wherein the shopping device is a smart phone.

4. The method of claim 1, wherein the shopping device is a pair of smart glasses.

5. The method of claim 1, further comprising:
   receiving a request to link the shopping device with a second shopping device;
   sending the request to the second shopping device;
   receiving a response from the second shopping device authorizing the linking; and
   linking the shopping device with the second shopping device to allow communications between the two shopping devices.

6. The method of claim 5, wherein the response is generated through the character on both the shopping device and the second shopping device, and the method further comprises:
   determining a second response based on the response, the input, and a second character personality profile for a second character associated with the second shopping device; and
   generating the second response through the second character on both the shopping device and the second shopping device.

7. A system for providing shopping assistance to a user within a retail store using an interactive character comprising:
   a shopping device in a retail store that receives input requesting shopping assistance from a character displayed on the device, the shopping device comprising a processor that executes instructions to implement an input processing module, a response module, an augmented reality (AR) tag handler, and a character generator, the processor providing choices of characters to be selected at the shopping device, wherein the choices are based on known information of the user, providing the character in response to a selection, receiving store loyalty information for the user, and generating a current location of the shopping device within the store using in store tracking mechanisms;
   the input processing module processing the input based on the current location, including items or fixtures in the retail store at the current location;
   the response module determining a response based on the processed input and a character personality profile corresponding to the character; and
   the character generator generating the response through the character on a display of the shopping device;
   the AR tag handler:
      identifying one of a plurality of AR tags that are located throughout the retail store, the identified AR tag detected within the display of the shopping device and corresponding to a product; and
      replacing the AR tag on the display of the shopping device with content related to the corresponding product.

8. The system of claim 7, wherein the input originates from speech and the input processing includes:
   converting the speech to text;
   analyzing the text using natural language processing; and
   analyzing the text for sentiment meaning.

9. The system of claim 7, wherein the shopping device is a smart phone or a pair of smart glasses.

10. The system of claim 7, further comprising:
   a device linker for linking shopping devices, wherein the device linker:
      receives a request to link the shopping device with a second shopping device;
      sends the request to the second shopping device;
      receives a response from the second shopping device authorizing the linking; and
      links the shopping device with the second shopping device to allow communications between the two shopping devices.

11. The system of claim 10, wherein the response is generated through the character on both the shopping device and the second shopping device, further comprising:
- determining a second response based on the response, the input, and a second character personality profile for a second character associated with the second shopping device; and
- generating the second response through the second character on both the shopping device and the second shopping device.

12. A non-transitory computer readable medium with instructions stored thereon that, when executed by a processor, provide shopping assistance to a user within a retail store using an interactive character, the providing comprising:
- providing choices of characters to be selected at a shopping device, wherein the choices are based on known information of the user;
- providing at the shopping device the character in response to a selection;
- receiving store loyalty information for the user;
- generating a current location of the shopping device within the store using in store tracking mechanisms;
- receiving input at the shopping device in the retail store, the input requesting shopping assistance from the character, wherein the character is displayed on a display of the shopping device;
- processing the input based on the current location, including items or fixtures in the retail store at the current location;
- determining a response based on the processed input and a character personality profile corresponding the character;
- generating the response through the character displayed on the shopping device; and
- executing an augmented reality (AR) application, the AR application:
  - identifying, using a camera of the shopping device, one of a plurality of AR tags that are located throughout the retail store, the identified AR tag corresponding to a product and appearing within the display of the shopping device; and
  - replacing the AR tag on the display with content related to the corresponding product.

13. The computer readable medium of claim 12, wherein the input originates from speech and the input processing includes:
- converting the speech to text;
- analyzing the text using natural language processing; and
- analyzing the text for sentiment meaning.

14. The computer readable medium of claim 12, wherein the shopping device is a smart phone.

15. The computer readable medium of claim 12, wherein the shopping device is a pair of smart glasses.

16. The computer readable medium of claim 12, wherein the providing further comprises:
- receiving a request to link the shopping device with a second shopping device;
- sending the request to the second shopping device;
- receiving a response from the second shopping device authorizing the linking; and
- linking the shopping device with the second shopping device to allow communications between the two shopping devices.

17. The computer readable medium of claim 16, wherein the response is generated through the character on both the shopping device and the second shopping device, and the providing further comprises:
- determining a second response based on the response, the input, and a second character personality profile for a second character associated with the second shopping device; and
- generating the second response through the second character on both the shopping device and the second shopping device.

* * * * *